United States Patent Office 3,796,605
Patented Mar. 12, 1974

---

3,796,605
LITHIUM ELECTROCHEMICAL GENERATOR
Victor Dechenaux, Iteuil, and Françoise Drouet, Poitiers, France, assignors to SAFT-Societe des Accumulateurs Fixes et de Traction, Romainville, France
Filed Mar. 6, 1972, Ser. No. 231,832
Claims priority, application France, Mar. 5, 1971, 7107720
Int. Cl. H01m 35/02
U.S. Cl. 136—6 LN                    7 Claims

ABSTRACT OF THE DISCLOSURE

An electrochemical generator with a non-aqueous electrolyte and a negative electrode which mainly contains lithium. The positive active material comprises at least one fluorinated hydrocarbon polymer. The solvent of the electrolyte is a mixture of tetrahydrofuran-dimethoxyethane or tetrahydrofuran-dimethylether of diethylene glycol or dioxolane.

RELATED APPLICATION

A related application by Jean-Paul Gabano and Yves Jumel, entitled, "Lithium Base Electrochemical Generator," "Ser. No. 231,830, filed Mar. 6, 1972, and filed concurrently herewith is copending.

BRIEF SUMMARY OF INVENTION

This invention relates to electrochemical generators with a non-aqueous electrolyte and an active negative material which comprises lithium.

Applicants have noted the following surprising results.

In certain cells in which the positive active material is agglomerated by means of a fluorinated polymer such as polytetrafluorethylene for example, and in the presence of specific electrolytes, a voltage level appears and in such case, the practical capacity of the electrode notably exceeds the theoretical capacity as calculated from the quantity of active positive material.

Analysis carried out by radiocrystallography before and after discharge on positive electrodes prepared at the outset from a mixture of an active material and of polytetrafluorethylene (PTFE) has shown that after discharge the PTFE peak has disappeared and new peaks appear corresponding to lithium fluoride. The reducing reaction then is:

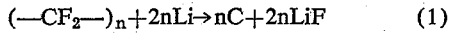
$$(-CF_2-)_n + 2nLi \rightarrow nC + 2nLiF \qquad (1)$$

This is well confirmed by the presence of black carbon particles in the positive electrode in its reduced state.

In another connection, the collected capacity during the course of discharge corresponds to a 100 percent utilization of PTFE.

As a consequence of these results, applicants conceived the idea of utilizing fluorinated polymers as a constituent of the active material in electrochemical generators embodying lithium.

Nevertheless, applicants established the fact that the nature of the solvent for the non-aqueous electrolyte played a considerable role. This was so because a number of solvents were tried without success by applicants, such as propylene carbonate.

This invention has for an object an electrochemical generator having a non-aqueous electrolyte in which the active negative material has a lithium base and characterized by the fact that the active positive material comprises a fluorinated hydrocarbon polymer, the solvent for the electrolyte being selected from the group consisting of mixtures of tetrahydrofuran-dimethoxyethane, and tetrahydrofuran-dimethylether of diethylene glycol. Other heterocyclic compounds similar to tetrahydrofuran may be used as the solvent medium such as dioxolane.

The aforementioned fluorinated polymer may be selected from polymers of tetrafluorethylene (PTFE) and copolymers of fluorinated ethylene and propylene (PFEP). The fluorinatel hydrocarbons and their polymers are commercially available.

Since the fluorinated hydrocarbons are electrically insulative it may be necessary to add a conductive body to the positive material to insure their reduction.

The conductive bodies, for example, may be soot (carbon black), the proportion of the soot in the active material may be of the order, for example, of 2–12%. Graphite may be utilized advantageously in slightly higher proportions. Appropriate metallic powder, for example, of copper or nickel, can also be utilized as the conductive body, as set forth in greater detail in said copending application.

Other characteristics of the invention will become apparent from the following description of individual tests carried out with different embodiments of electrochemical generators conforming to the invention, in conjunction with the accompanying drawings. The ordinates show voltage V and the abscissa show time T, in hours, in each figure thereof.

DETAILED DESCRIPTION

EXAMPLE 1

Figure 1:
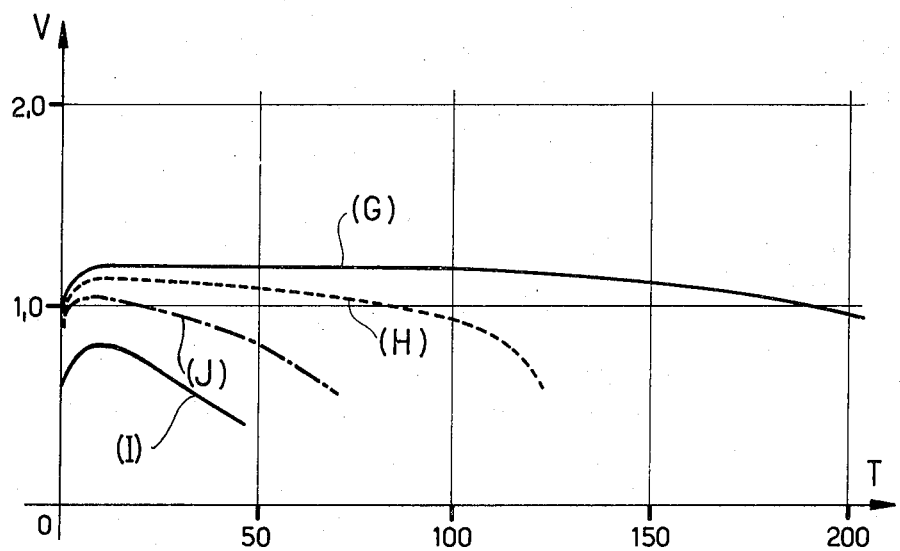
FIG. 1 is a graphic illustration of test results on cells of button type in which the positive electrode was prepared from an initial mixture comprising by weight 85 parts of PTFE, 15 parts of graphite and 25 parts of camphor serving as a pore forming agent and subsequently eliminated by heat.

Referring now to the drawings and first to FIG. 1, this illustrates test results on cells of a button type, in which the positive electrode was prepared from an initial mixture comprising by weight 85 parts of PTFE, 15 parts of graphite and 25 parts of camphor serving as a pore forming agent eliminated subsequently by heat.

In such cells, the positive electrode had an active surface of approximately 10 cm.$^2$ and was placed between two lithium electrodes.

The electrolyte comprised a molar solution of lithium perchlorate in a mixture comprising by volume approximately 70% of tetrahydrofuran and 30% of 1,2-dimethoxyethane.

The results on discharge are shown on FIG. 1.

Curves G, H and J respectively correspond to discharges through 200-ohm, 100-ohm and 50-ohm resistances.

The theoretical capacity based upon the reaction of Formula 1 hereinabove is about 1.31 Ah. The actual resulting capacity efficiencies obtained by discharges through 200, 100 and 50 ohms respectively are 90.5, 94 and 96.5%.

Curve I of FIG. 1 corresponds to discharge through a 50-ohm resistance, of an analogous cell in which the electrolyte comprised a 1.5 molar solution of lithium perchlorate in dioxolane.

EXAMPLE 2

Figure 2:
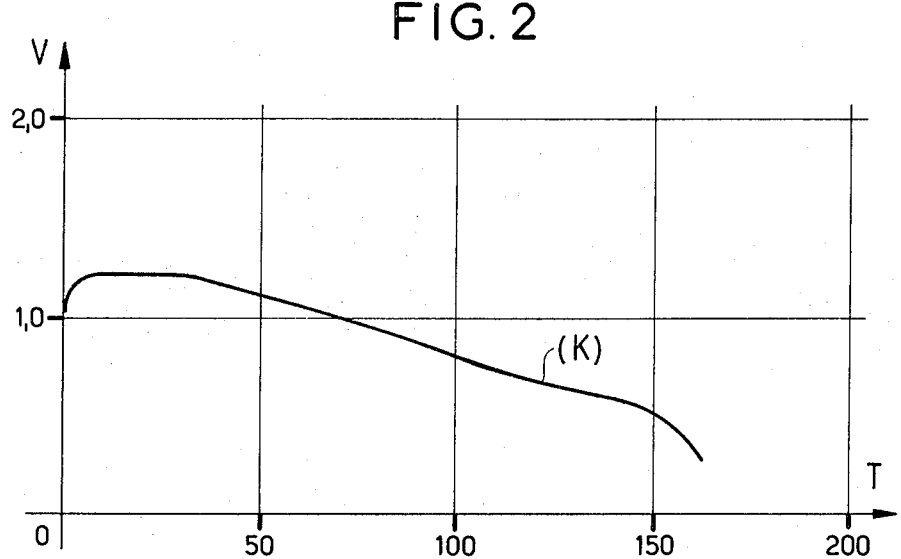
FIG. 2 is a graph summarizing results obtained on using a positive electrode comprising by weight 94% of PTFE and 6% of soot (carbon black).

Referring now to the curve of FIG. 2, it depicts test results on cells with lithium negative electrodes obtained by using therein a positive electrode comprising by weight 94% of PTFE and 6% of soot (carbon black).

The electrolyte comprised by volume 20% of the dimethylether of diethylene glycol and 80% of a solution of tetrahydrofuran containing about 150 g./l. of lithium perchlorate.

The discharge was effected through a resistance of 100 ohms.

The theoretical capacity based upon the reaction of Formula 1 above is about 1.91 Ah.

The capacity efficiency was 76%.

EXAMPLE 3

Figure 3:
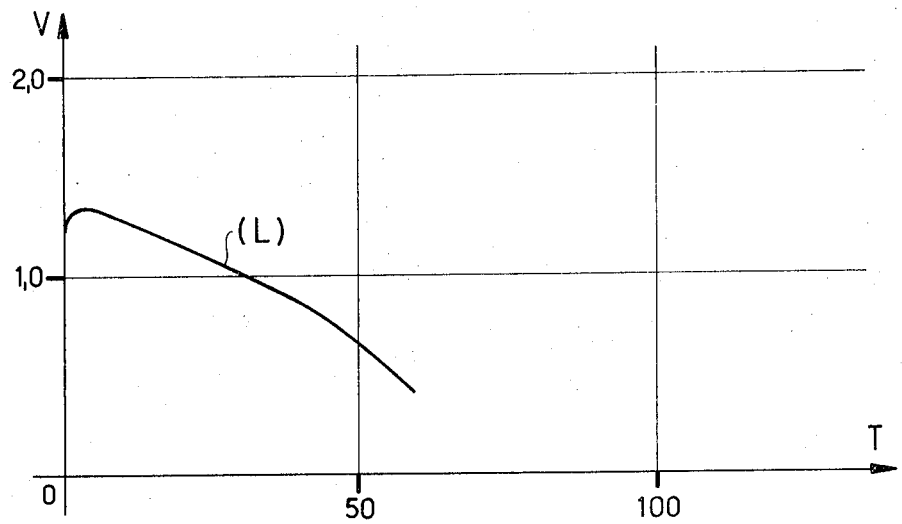
FIG. 3 is a graph summarizing results obtained when using a positive electrode comprising by weight 90 parts of PFEP, 10 parts of soot (carbon black) and 25 parts of ammonium carbonate serving as a pore forming agent and subsequently eliminated by heat.

Referring now to FIG. 3, it depicts results in cells wherein the negative electrode was lithium, the positive electrode comprised by weight 90 parts of PFEP, 10 parts of soot and 25 parts of ammonium carbonate, serving as a pore forming agent and subsequently eliminated by heat.

The electrolyte was comprised of a molar solution of lithium perchlorate in a mixture comprising by volume approximately 70% of tetrahydrofuran and 30% of 1,2-dimethoxyethane.

The discharge of such cell was effected through a 50-ohm resistance.

The theoretical capacity calculated with reference to fluorine, in a manner analogous to the reaction of Formula 1 hereinabove is about 1.07 Ah.

The actual capacity efficiency is practically 100%.

EXAMPLE 4

Figure 4:
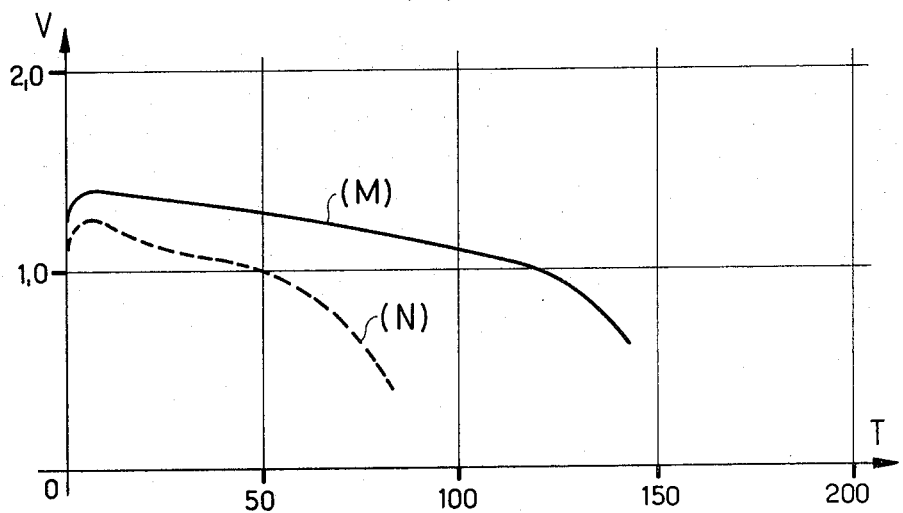
FIG. 4 is a graph summarizing results using a positive electrode comprising by weight 45 parts of PFEP, 47 parts of PTFE and 8 parts of soot (carbon black).

Referring now to the curves of FIG. 4, they depict test results on cells wherein the negative electrode was lithium and the positive electrode comprised by weight 45 parts of PFEP, 47 parts of PTFE and 8 parts of soot (carbon black).

Th electrolyte comprised a molar solution of lithium perchlorate in a mixture comprising by volume approximately 70% of tetrahydrofuran and 30% of 1,2-dimethoxyethane.

The theoretical capacity is 1.57 Ah.

The curve M depicts results of a discharge through a resistance of 100 ohms. The actual capacity efficiency is practically 100%.

The curve N depicts results of discharge through a 50-ohm resistance. The capacity efficiency is approximately 97%.

It is understood that the invention is not limited to the described embodiments which are given only as examples. In particular, without departing from the scope of the invention, modifications in detail, changes in disposition and replacement of described means by equivalents are contemplated.

What is claimed is:

1. In an electrochemical generator having a non-aqueous electrolyte, positive active material and a negative electrode having a lithium base, that improvement wherein the positive active material of said generator solely consists of at least about 85 parts of a fluorinated hydrocarbon polymer that is electrochemically reducible in said electrolyte together with about at most 15 parts of an inert conductive body dispersed in said polymer and selected from the group consisting of carbon black, graphite, iron and copper and wherein the electrolyte comprise a lithium salt solute and as a solvent therefor compounds selected from the group consisting of dioxolane, mixtures of tetrahydrofuran and dimethoxyethane, and mixtures of tetrahydrofuran and diethylene glycol dimethyether.

2. In an electrochemical generator according to claim 1, said fluorinated polymer in said positive active material being selected from the group consisting of polymers of tetrafluoroethylene and of fluorinated ethylene and propylene, said positive active material consisting by weight solely of 85 parts of said polymer and 15 parts of a said conductive body to insure electrochemical reduction of said polymer during operation of said generator.

3. In an electrochemical generator according to claim 1, said conductive body being soot whose ponderal proportion in the active positive material is of the order of from approximately 2 to approximately 12% by weight.

4. In an electrochemical generator according to claim 3, said conductive body being graphite.

5. In an electrochemical generator according to claim 1, said non-aqueous electrolyte comprising about a molar solution of lithium perchlorate in a mixture comprising by volume approximately 70% of tetrahydrofuran and 30% of dimethoxyethane.

6. In an electrochemical generator according to claim 1, said electrolyte comprising by volume approximately 20% of diethylene glycol dimethylether and approximately 80% of a solution of tetrahydrofuran containing about 150 g./l. of lithium perchlorate as said solute.

7. An electrochemical generator comprising a non-aqueous electrolyte consisting of a 1.5 molar solution of lithium percholrate solute in dioxolane solvent, a negative electrode containing lithium as negative active material, and a positive electrode whose positive active material consists solely of a mixture by weight of about 85 parts of polytetrafluoroethylene, 15 parts of graphite as conductive body and 25 parts of camphor as pore former, the camphor being eliminated by heating prior to introduction of the positive electrode into said cell.

References Cited

UNITED STATES PATENTS

| | | | |
|---|---|---|---|
| 3,658,592 | 4/1972 | Dey | 136—6 LN |
| 3,686,038 | 8/1972 | Gorth | 136—100 R |
| 3,542,602 | 11/1970 | Gabano | 136—155 |
| 3,542,601 | 11/1970 | Gabano | 136—100 R |
| 3,567,515 | 3/1971 | Maride et al. | 136—6 LN |
| 3,639,174 | 2/1972 | Kegelman | 136—6 LN |
| 3,514,337 | 5/1970 | Braewer | 136—6 LN |

ALLEN B. CURTIS, Primary Examiner

C. F. LEFEVOUR, Assistant Examiner

U.S. Cl. X.R.

136—100, 155